United States Patent [19]

Guzder et al.

[11] 4,356,898
[45] Nov. 2, 1982

[54] VALVE ASSEMBLY AND REDUCED HARSHNESS SHOCK ABSORBER EMBODYING THE SAME

[75] Inventors: Shapoor B. Guzder, Deerfield; Eugene N. Zavodny, Bloomingdale, both of Ill.

[73] Assignee: Maremont Corporation, Carol Stream, Ill.

[21] Appl. No.: 96,155

[22] Filed: Nov. 20, 1979

[51] Int. Cl.$^3$ ............................................. F16F 9/50
[52] U.S. Cl. ................................. 188/280; 188/282; 188/315; 188/317; 188/322.15
[58] Field of Search ............... 188/280, 281, 282, 313, 188/315, 317, 322, 322.15; 137/517, 859

[56] References Cited

U.S. PATENT DOCUMENTS

| | | | |
|---|---|---|---|
| 1,154,962 | 9/1915 | Bayles | 137/517 |
| 2,327,295 | 8/1943 | Whisler | 188/280 |
| 2,396,227 | 3/1946 | Beecher | 188/317 |
| 2,818,942 | 1/1958 | Bliven | 188/317 |
| 3,173,671 | 3/1965 | Broadwell | 188/315 |
| 3,633,605 | 1/1972 | Smith | 137/859 |

FOREIGN PATENT DOCUMENTS 1264165 3/1968 Fed. Rep. of Germany ...... 188/282
2426326 12/1974 Fed. Rep. of Germany ...... 188/280

Primary Examiner—Edward R. Kazenske
Attorney, Agent, or Firm—Allegretti, Newitt, Witcoff & McAndrews, Ltd.

[57] ABSTRACT

A shock absorber including a piston assembly dividing a cylinder into a rebound chamber and a compression chamber, the piston assembly including fluid control bleed orifices of a size to permit flow therethrough during a relatively slow long amplitude movement of the piston assembly in either direction, normally closed valves for controlling the flow of fluid between the chambers during relatively fast long amplitude movements of the piston assembly, and a normally open valve assembly operable (1) to permit relatively unrestricted flow of hydraulic fluid between the chambers during a relatively rapid short amplitude movement of the piston assembly in either direction and (2) to move into a closed position (a) during a relatively slow long amplitude movement of the piston assembly in either direction so as to permit the bleed orifices to control the resultant fluid movement between the chambers and (b) during a relatively rapid long amplitude movement so as to permit the normally closed valves to control the resultant fluid movement between the chambers.

7 Claims, 4 Drawing Figures

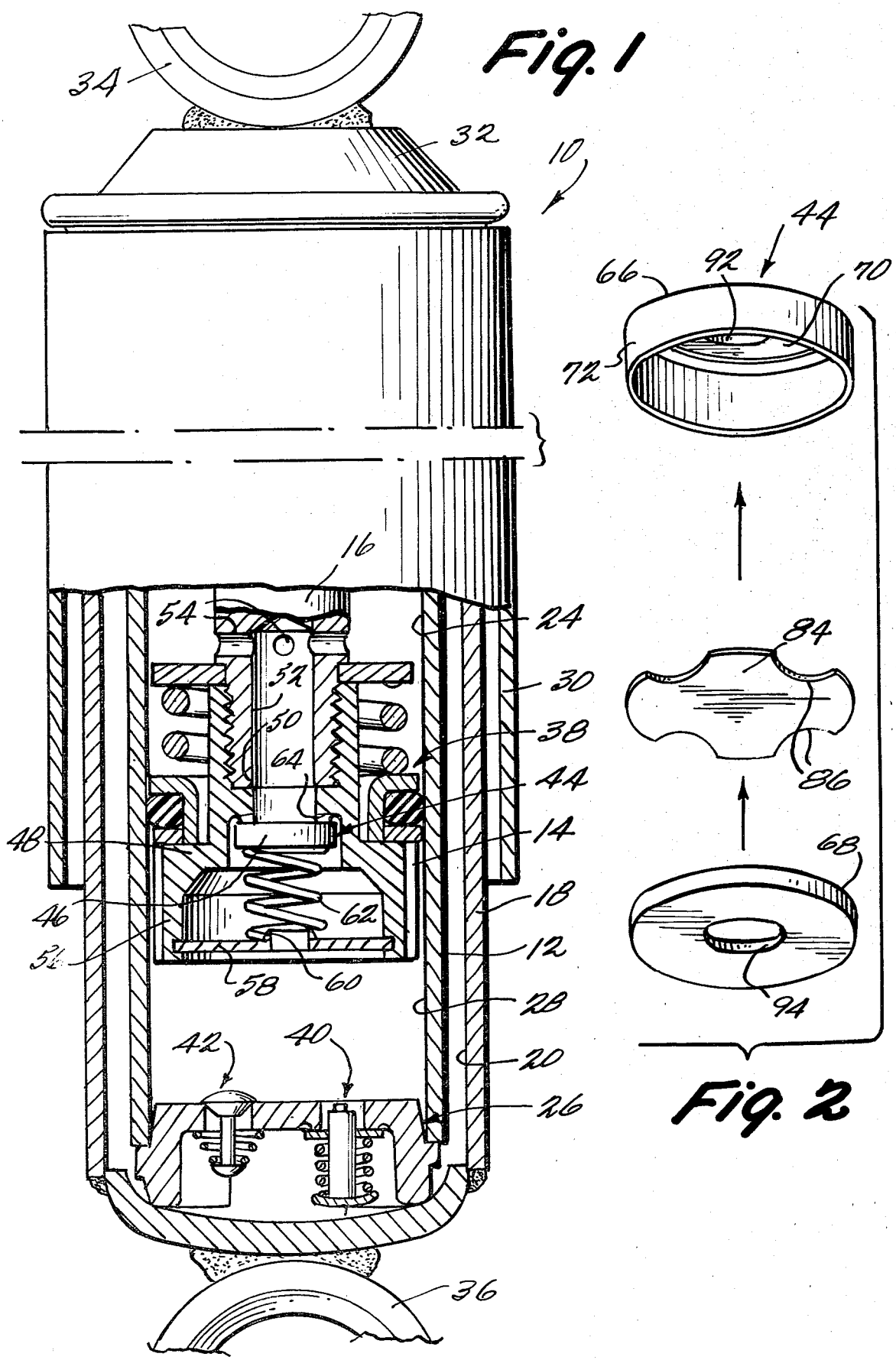

VALVE ASSEMBLY AND REDUCED HARSHNESS SHOCK ABSORBER EMBODYING THE SAME

This invention relates to shock absorbers and, more particularly, to improvements in the valving of hydraulic fluid within a shock absorber to improve the ride characteristics thereof and reduce harshness.

Presently available shock absorbers provide adequate performance under most operating conditions. One situation which presents some ride harshness is a situation where the shock absorber undertakes a rapid movement of relatively short amplitude. Movements of this type may occur, for example, when the automobile is moving at a fair rate of speed over a relatively smooth road having periodic tar strips or other small protuberances therein. In the usual shock absorber, bleed orifices or passages are provided which permit relatively restricted flow of fluid between the rebound and compression chambers of the shock absorber. However, such bleed orifices are usually provided to arrest the relatively slow and long amplitude movements imparted to the shock absorber when, as for example, the automobile is moving through an intersection formed with one or more slight dips to accommodate water flow. It would be possible to simply enlarge the bleed orifices or restricted flow passages, so as to reduce the harsh effect of the aforesaid initial rapid and relatively short amplitude movements. However, this would significantly reduce the effectiveness of the aforesaid passages to arrest the relatively slow and long amplitude movements. Of course, where a greater measure of damping control is required as with relatively fast and relatively long amplitude movements, the bleed orifice is simply over-ridden and this more stringent control is provided by the usual valving functions.

It is an object of the present invention to provide for the reduction in the harshness occasioned by a relatively rapid and short amplitude movement of the type noted above while at the same time providing for effective control of relatively slow and long amplitude movements. In accordance with the principles of the present invention, this objective is obtained by providing a valve assembly which is normally open to permit flow of the type occasioned by a rapid and short amplitude movement, which valve assembly will close in response to a movement which is relatively slow and of a longer amplitude thereby permitting the normal bleed passage to accomplish its normal function.

Preferably, the valve assembly is embodied in a simple three-piece construction providing an exterior configuration of disk-like construction which preferably performs the function of a valve member itself in rebound.

Another object of the present invention is the provision of a valve assembly of the type described which is simple in construction, economic to manufacture and effective in operation.

These and other objects of the present invention will become more apparent during the course of the following detailed description and appended claims.

The invention may best be understood with reference to the accompanying drawings wherein an illustrative embodiment is shown.

In the drawings,

FIG. 1 is a front elevational view partly in vertical section of a shock absorber provided with an improved control valve assembly embodying the principles of the present invention;

FIG. 2 is an exploded perspective view of the components of the control valve assembly shown in the shock absorber illustrated in FIG. 1;

Figure 3:
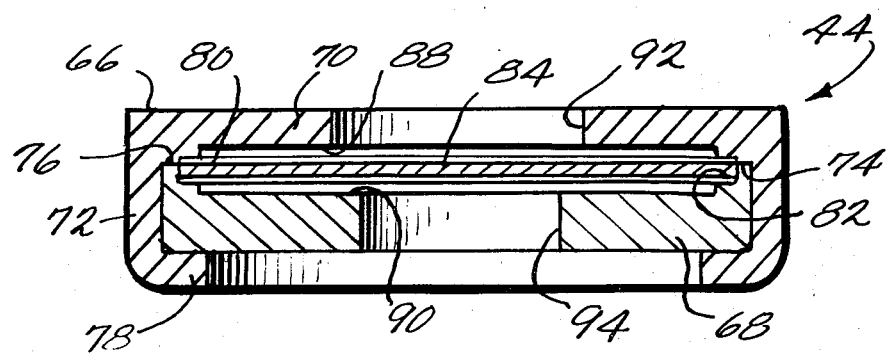
FIG. 3 is a vertical sectional view of the control valve assembly.

Referring now more particularly to the drawings, there is shown in FIG. 1 thereof a shock absorber, generally indicated at 10, which embodies the principles of the present invention. The shock absorber which is of the twin tube type but may be a single tube type, if desired, includes the usual inner tube or cylinder member 12 within which is slidably mounted a piston assembly, generally indicated at 14. A piston rod 16 is fixedly connected with the piston assembly 14 and extends axially therefrom outwardly through one end of the cylinder member. An intermediate tube 18 is disposed in surrounding relation with the cylinder member 12. The interior of the intermediate tube defines with the exterior of the cylinder member an annular reservoir chamber 20.

Fixedly connected with the upper end of the cylinder member 12 and the upper end of the intermediate tube 18 is a seal assembly (not shown) which serves to slidably receive the piston rod 16 therethrough. The seal assembly is of conventional construction and serves to enclose the upper end of the reservoir chamber 20 and to define the upper end of a rebound chamber 24 within the cylinder member 12, the lower end of which is defined by the piston assembly 14. The volume of the rebound chamber 24 is thus variable depending upon the position of the sliding movement of the piston assembly 14 within the cylinder member 12, as is well known in the art.

A base and end cap assembly, generally indicated at 26, is fixedly connected with the lower end of the cylinder 12 and intermediate tube 18. Here again, the base and end cap assembly 26 is of conventional construction and serves to partially enclose the lower end of the reservoir chamber 20 and to provide for controlled communication thereof with the lower end of a compression chamber 28 within the cylinder member 12, the lower end of which is defined by the base and end cap assembly and the upper end of which is defined by the piston assembly 14. The compression chamber 28 is variable in volume, depending upon the position of sliding movement of the piston assembly 14 within the cylinder member 12.

The shock absorber 10 also includes the usual outer dust tube 30, the upper end of which is suitably connected with the outer end of the piston rod 16. It will be understood, however, that in accordance with conventional procedure the dust tube may be eliminated where required to suit the particular installation. As shown, this connection is effected by an end cap 32 to which is rigidly secured a mounting connector 34. The connector 34 may be of any conventional configuration, such as the ring as shown or a stud. A similar mounting connector 36 is fixedly secured to the exterior of the base and end cap assembly 26. In accordance with conventional practice, the shock absorber 10 when mounted in operative relation on a vehicle is generally oriented so that the connector 34 secured to the outer end of the piston rod 16 is disposed upwardly while the other connector is oriented in a downward position with respect thereto.

It will be understood that the shock absorber 10 is also provided with hydraulic fluid which fills both the rebound and compression chamber 24 and 28 and partially fills the replenishing or reservoir chamber 20. In accordance with conventional practice, the riding characteristics of the shock absorber are determined by controlling the flow of hydraulic fluid between the various chambers during the telescopic movements of the shock absorber occasioned by the relative movement of the sprung and unsprung masses of the vehicle. Compression control of the hydraulic fluid is accomplished when the piston assembly 14 is moved in a downward direction causing the compression chamber 28 to reduce in volume and the rebound chamber 24 to increase in volume. Control of the flow of hydraulic fluid from the reducing volume compression chamber to the increasing volume rebound chamber is provided by an annular valve assembly 38 mounted on the periphery of the piston assembly 14 and disposed in flow control relation with the interior of the cylinder member 12. Here again, the construction of the piston assembly valve assembly 38 is of a conventional nature. Since the rebound chamber 24 contains the piston rod and the compression chamber does not, the differential volume of hydraulic fluid in decreasing volume compression chamber 28 must pass to the reservoir chamber 20. Control of this flow is accomplished by a compression valve assembly 40 mounted in the base and end cap assembly 26. Here again, the construction of the base compression valve assembly 40 is well known.

Rebound control is accomplished when the piston assembly 14 moves upwardly within the cylinder member 12. Under these circumstances hydraulic fluid must pass from the decreasing volume rebound chamber 24 into the increasing volume compression chamber 28. Here again, because of the piston rod displacement additional hydraulic fluid must be introduced into the increasing volume compression chamber and such hydraulic fluid comes from the replenishing or reservoir chamber 20. Control of the latter flow is accomplished by means of a replenishing valve 42 mounted in the base and end cap assembly 26. Replenishing valve 42 is of conventional construction.

A rebound control disk valve, generally indicated at 44, is provided for controlling fluid flow from the decreasing volume rebound chamber 24 into the increasing volume compression chamber 28. Valve 44 is disposed below a downwardly facing annular valve seat 46 formed in the central portion of a piston member 48 forming a basic component part of the piston assembly 14. Piston member 48 includes a central opening 50 or passage extending therethrough upwardly from within the annular valve seat 46. Piston rod 16 threadedly engages within the upper end of opening 50 and has a central bore 52 in the lower end thereof which communicates the opening 50 with the rebound chamber 24 through lateral bores 54 formed in the piston rod.

Piston member 48 includes an annular skirt 56 the exterior periphery of which is slotted to provide communication of the fluid in compression chamber 28 with the compression control annular valve assembly 38 carried by the piston assembly 14. A disk-shaped spring support 58 has its exterior periphery suitably fixed within the lower end of the annular skirt 56 and an upstanding annular flange 60 formed in the interior thereof. A coil spring 62 has its lower end seated over the spring support flange 60 and its upper end engaged with valve 44 so as to resiliently urge the same into closed relation with valve seat 46. As best shown in FIG. 1, valve seat 46 has a plurality of bleed passages or orifices 64 formed therein which provide for restricted communication between the compression and rebound chambers when the valve 44 is engaged on seat 46. Restricted communication between the compression and rebound chambers can alternately be provided by the substitution of a split piston seal configuration for the O-ring seal shown as a component of the annular valve assembly 38. Relatively large amplitude piston assembly rebound movements are controlled by movement of the valve 44 from seat 46.

In accordance with the principles of the present invention, a normally open valve assembly is embodied within valve 44 to enable relatively fast short amplitude piston assembly movements to take place without a resulting harshness. The exterior of valve 44 is of disk-shaped configuration formed by a housing structure which includes an upper outer annular housing member 66 and lower inner housing member 68. Outer housing member 66 includes an annular end wall 70 and a generally cylindrical peripheral skirt 72 extending downwardly therefrom. When the housing structure is assembled, inner member 68 is moved upwardly within the skirt 72 until a pair of opposed interior peripheral annular shoulders 74 and 76 interengage and then the lower extremity of the skirt 72 is rolled or peened under the lower marginal periphery of the inner member, as indicated at 78 in FIG. 3.

In assembled relation, the outer and inner housing members provide spaced opposed annular mounting surfaces 80 and 82 adjacent shoulders 76 and 74, respectively. Mounted between the mounting surfaces 80 and 82 is the outer periphery of a thin valve member 84. As best shown in FIG. 2, the periphery of valve member 84 is formed with a series of recesses or cut-outs 86 which provide for hydraulic fluid flow past the periphery of the valve member radially inwardly of the confining surfaces 80 and 82. Preferably, valve member is loosely confined between the surfaces 80 and 82 (exaggerated in FIG. 3) although a tight confinement may be utilized, if desired.

The outer and inner housing members also provide opposed annular valve seats 88 and 90 disposed centrally radially inwardly and slightly axially outwardly of the annular mounting surfaces 80 and 82, respectively. The annular valve seats 88 and 90 surround the inner ends of aligned axially extending central fluid passages or openings 92 and 94, respectively.

As previously indicated, the normally open valve assembly within valve 44 is provided for the purpose of enabling the piston assembly 14 to undertake a relatively fast low amplitude movement in either direction without imparting harsh riding characteristics. If it is assumed that the initial such movement is in the compression direction, it will be noted that the fluid from the compression chamber 28 is capable of flowing through passage 94 around the exterior periphery of the valve member 84 through recesses 86 and out of the passage 92 into the rebound chamber 24. Upon movement of the piston in the rebound direction, flow in the opposite direction can be accomplished. The arrangement is such that the openings 86 in the periphery of the valve member 84 do not offer substantial resistance to flow. However, the cross-sectional area of the valve member 84 is such that a relatively small pressure change will cause the valve member to flex so as to engage the corresponding annular valve seat 88 or 90 and cut off flow. This action will occur when the amplitude of the movement is greater than a very small amount. In such rebound action, the flow from the rebound chamber 24 will be diverted and caused to flow through the restricted passages such as those formed by bleed orifices 64. Further increases in the upward velocity of the piston assembly 14 will result in increased fluid pressure above the valve assembly 44. With such increased rebound movement, valve 44 will move downwardly under the action of spring 62 away from the valve seat 46 to provide control. During a corresponding compression movement, valve member 44 remains seated on the seat 46 and control across the piston assembly 14 is provided by the compression control valve assembly 38. It will also be noted that whenever valve 44 is in engagement with seat 46, bleed passages 64 are operable to enable slow long amplitude movements to be effectively controlled without harshness and that such action will be provided independent of the operation of the normally open valve assembly within valve 44.

Figure 4:
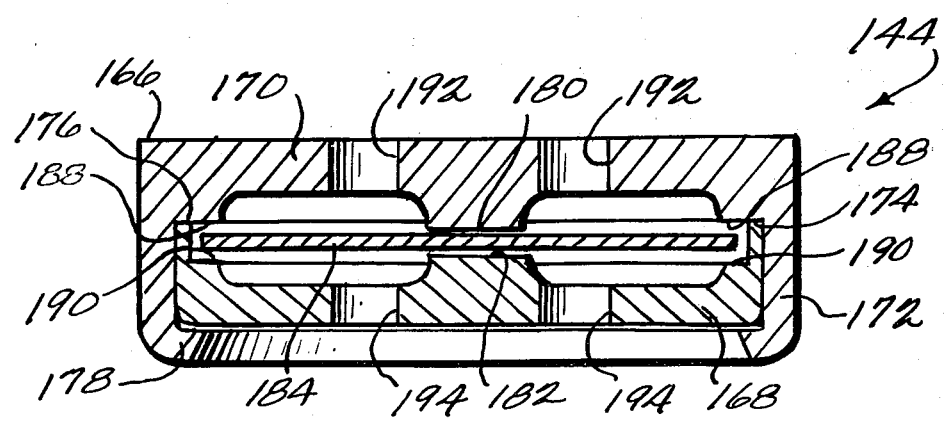
FIG. 4 is a view similar to FIG. 3 illustrating another form of the control valve assembly embodying the principles of the present invention.

In FIG. 4 there is shown a modified form of valve generally indicated at 144, which may be utilized in lieu of valve 44. As before, the exterior of valve 144 is of disk-shaped configuration formed by a housing structure which includes an upper outer annular housing member 166 and lower inner housing member 168. Outer housing member 166 includes an annular end wall 170 and a generally cylindrical peripheral skirt 172 extending downwardly therefrom. When the housing structure is assembled, inner member 168 is moved upwardly within the skirt 172 until a pair of opposed interior peripheral annular shoulders 174 and 176 interengage and then the lower extremity of the skirt 172 is rolled or peened under the low marginal periphery of the inner member, as indicated at 178 in FIG. 4.

In assembled relation, the outer and inner housing members 166 and 168 provide centrally located spaced opposed annular mounting surfaces 180 and 182, respectively. Mounted between the mounting surfaces 180 and 182 is the central annular portion of a thin valve member 184. As best shown in FIG. 4, the periphery of valve member 184 is spaced inwardly from the shoulders 174 and 176 so as to provide for hydraulic fluid flow past the periphery of the valve member radially outwardly of the confining surfaces 180 and 182. Preferably, valve member 184 is loosely confined between the surfaces 180 and 182 (exaggerated in FIG. 4) although a tight confinement may be utilized, if desired.

The outer and inner housing members 166 and 168 provide opposed annular valve seats 188 and 190 disposed radially outwardly adjacent the shoulders 174 and 176 and slightly axially outwardly of the annular mounting surfaces 180 and 182, respectively. A series of annularly spaced fluid passages or openings 192 extend axially through the end wall 170 of the outer housing member 166 between the central mounting surface 180 and outer annular valve seat 188 thereof and a corresponding series of annularly spaced fluid passages or openings 194 extend axially through the inner housing member 168 between the central mounting surface 182 and the outer annular valve seat 190 thereof.

It can be seen that the normally open valve assembly within valve 144 operates in the same fashion as valve 44 except that the flexure of the valve member 184 which takes place when moved from its normally open position into its closed position is a flexure of the outer annular portion thereof while the inner annular portion is confined against movement, a reversal of the flexing movement of the valve member 84.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A shock absorber comprising:
   a cylinder member;
   a piston assembly having an axis aligned with the axis of said cylinder member;
   a piston rod fixed to said piston assembly and extending axially therefrom outwardly of one end of said cylinder member disposed upwardly when said shock absorber is operatively mounted;
   an intermediate tube surrounding said cylinder member, the interior of which defines with the exterior of said cylinder member an annular reservoir chamber;
   the portion of said cylinder member above the piston assembly constituting a rebound chamber the volume of which is variable depending upon the position of said piston assembly within said cylinder member;
   a base and end cap assembly fixedly connecting the lower end of said cylinder member and said intermediate tube so as to define the lower end of a compression chamber within said cylinder member the upper end of which is defined by the piston assembly and the volume of which is variable depending upon the position of said piston assembly within said cylinder member;
   hydraulic fluid filling said rebound and compression chambers and partially filling said reservoir chamber;
   restricted fluid flow control means on the exterior periphery of said piston assembly cooperable with the interior periphery of said cylinder member providing for controlled restricted flow of hydraulic fluid between said compression chamber and said rebound chamber during the movement of said piston member within said cylinder member;
   base valve means in said base and end cap assembly providing for controlled flow of hydraulic fluid from said compression chamber to said reservoir chamber during a compression movement of said piston member toward said other end of said cylinder member;
   replenishing valve means in said base and end cap assembly for enabling hydraulic fluid to flow from said reservoir chamber to said compression chamber during a rebound movement of said piston assembly toward said one end of said cylinder member;
   said piston assembly having a central opening therein communicating at its upper end with said rebound chamber and having at its lower end a downwardly facing annular valve seat surrounding the lower end of said opening;
   a rebound control disk valve disposed below said annular valve seat, said disk valve operable for movement into and out of sealing engagement with said valve seat; and spring means carried by said piston assembly resiliently urging said disk valve into engagement with said valve seat, the improvement wherein:

said rebound control disk valve includes normally open valve means formed interiorly in said disk valve and operable (1) in an open position to permit relatively unrestricted flow of hydraulic fluid through said disk valve between said chambers when said disk valve is engaged with said valve seat and (2) in a closed position to restrict flow of hydraulic fluid through said disk valve permitting said disk valve to control the fluid movement between said chambers by movement of the disk valve relative to said valve seat.

2. The improvement as defined in claim 1 wherein said normally open valve means comprises:

a housing structure defining an interior chamber having opposed first and second valve seats;

a thin flexible valve member disposed with said interior chamber in a normally unflexed position between and spaced from said first and second valve seats so as to permit fluid flow therebetween in either direction;

first fluid flow passage means disposed in cooperating relation with said first valve seat and extending from said interior chamber to the exterior of said housing structure;

said fluid flow passage means disposed in cooperating relation with said second valve seat and extending from said interior chamber to the exterior of said housing structure; and means mounting said valve member with respect to said housing structure for (1) flexure in one direction into closing engagement with said first valve seat so as to prevent flow of fluid through said first fluid passage means from said interior chamber in response to a flow of fluid through said second fluid passage means into said interior chamber at a first predetermined pressure (2) flexure in an opposite direction into closing engagement with said second valve seat so as to prevent flow of fluid through said second fluid passage means from said interior chamber in response to a flow of fluid through said first fluid passage means into said interior chamber of a second predetermined pressure.

3. The improvement as defined in claim 2 wherein said first and second valve seats are annular;

said valve member including an inner annular portion and an outer annular portion;

said mounting means including opposed annular mounting surfaces disposed in confining relation to one of said annular portions of said valve member so that (1) said first predetermined fluid pressure acting on said valve member causes the other annular portion thereof to flex in said one direction beyond the confinement of said one annular portion and into engagement with said first annular valve seat and (2) said second predetermined pressure acting on said valve member causes the other annular portion thereof to flex in said opposite direction beyond the confinement of said one annular portion and into engagement with said second annular valve seat.

4. The improvement as defined in claim 3 wherein said one annular valve portion constitutes the outer portion thereof, said first and second fluid passage means comprising axially aligned central openings.

5. The improvement as defined in claim 4 wherein said outer annular portion is formed with cutouts to permit flow thereby when in said unflexed position.

6. The improvement as defined in claim 3 wherein said one annular valve portion constitutes said inner annular portion, said first and second fluid passage means each comprising a plurality of annularly spaced openings.

7. The improvement as defined in claims 1, 2, 3, 4 or 5 wherein said housing structure includes an outer annular housing member including an annular end wall and a generally cylindrical peripheral skirt extending therefrom and an annular end member having said peripheral skirt surrounding the same and bent inwardly thereover.

* * * * *